United States Patent Office 3,528,960
Patented Sept. 15, 1970

3,528,960
N-CARBOXYAROYL INSULINS
Wilhelm L. Haas, Frankfurt am Main-Schwanheim, Germany, assignor to Eli Lilly and Company, Indianapolis, Ind., a corporation of Indiana
No Drawing. Substituted for application Ser. No. 516,143, Dec. 23, 1965. This application Oct. 7, 1968, Ser. No. 765,638
Int. Cl. A61k *17/02;* C07c *103/52;* C07g *7/00*
U.S. Cl. 260—112.7
4 Claims

ABSTRACT OF THE DISCLOSURE

Carboxyaroyl insulins, having about one to about three carboxyaroyl groups per insulin molecule, possessing high intrinsic activity, fast onset of activity, and long duration of activity.

BACKGROUND OF THE INVENTION

Since the isolation of insulin in 1921 by Banting, Best, Collip, and Macleod, the insulin molecule has been the subject of many attempts at chemical modification. Classically, even before any structural characteristics of the molecule were known, it was subjected to reaction with many diverse chemicals in the hope of obtaining a longer-acting derivative. Earliest of these attempts was acetylation, but the acetylated products usually had little or none of insulin's antidiabetic effect.

Other modifications of the insulin molecule were carried out, for example, by reaction with phenylisocyanate [K. Hallas-Møller, Archiv for Pharmai og Chemi, 52. Bind. 102. Aargang. Nr. 25 (Dec. 8, 1945), also Hopkins and Warmall, Biochem. J., 28, 2125 (1934)]. Products of these reactions usually retained some of their insulin activity and were, in general, somewhat longer acting.

Novo Therapeutisk Laboratorium, in its British patent, No. 614,990, Dec. 30, 1948, has described a benzoyl derivative of insulin wherein the average number of benzoyl groups per insulin molecule is 1.5 or less. This complex mixture of compounds has a prolonged effect but is somewhat less potent than amorphous insulin. At higher benzoyl group ratios, the specific antidiabetic activity is reduced below the useful level.

SUMMARY OF THE INVENTION

It has now been found that certain carboxyaroyl insulins, to be described hereinafter, have high intrinsic activity, a faster onset of activity, and a longer duration of activity.

The compounds of the present invention can be represented by the formula:

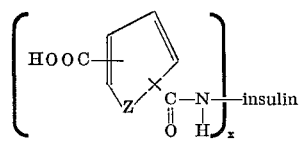

wherein
Z is

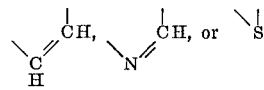

and $x$, the average number of carboxyaroyl groups in the molecule, is between about 1.5 and about 2.5; and
N is a basic amine function of the insulin molecule.

DETAILED DESCRIPTION

There are three terminal amino groups available for acylation on the insulin molecule. One is a portion of phenylalamine ($A_1$); one is a portion of glycine ($B_1$); and the third is the ε-amino group of lysine ($B_{29}$). Substitution of a carboxyaroyl moiety on one, two, or three of the terminal amino groups yields an insulin structure which now had added organic acid character, and thus is more soluble in the physiological fluids of the body.

These terminal amino groups are present in all forms of insulin, whether isolated from beef, pork, whale, or other mammal. The usual variations in the insulin structure occur at the amino acids labelled $A_4$, $A_8$, $A_9$, $A_{10}$, $B_2$, $B_3$, $B_{27}$, and $B_{30}$. Beef insulin is shown as a typical insulin molecule, but the invention is not meant to be limited to the beef derived species, since the invention concerns the nature of the acylating moiety and the degree of acylation achieved and not the sequence of the amino acid residues.

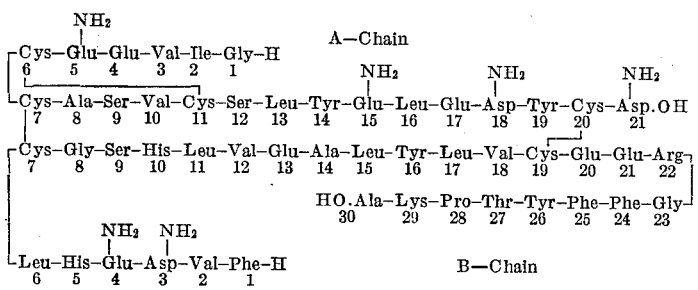

| Abbreviation | Amino acid fragment | Formula |
|---|---|---|
| Ala | Alanyl | $CH_3CH(NH_2)CO-$ |
| Arg | Arginyl | $H_2NC(:NH)NHCH_2CH_2CH_2CH(NH_2)CO-$ |
| AspNH$_2$ | Asparaginyl | $H_2NCOCH_2CH(NH_2)CO-$ |
| Cys | Cysteinyl | $HSCH_2CH(NH_2)CO-$ |
| Glu | Glutamyl | $HOOCCH_2CH_2CH(NH_2)CO-$ |
| GluNH$_2$ | Glutaminyl | $H_2NCOCH_2CH_2CH(NH_2)CO-$ |
| Gly | Glycyl | $H_2NCH_2CO-$ |
| His | Histidyl | $N_2C_3H_3CH_2CH(NH_2)CO-$ |
| Ile | Isoleucyl | $CH_3CH_2CH(CH_3)CH(NH_2)CO-$ |
| Leu | Leucyl | $(CH_3)_2CHCH_2CH(NH_2)CO-$ |
| Lys | Lysyl | $H_2NCH_2CH_2CH_2CH_2CH(NH_2)CO-$ |
| Phe | Phenylalanyl | $C_6H_5CH_2CH(NH_2)CO-$ |
| Pro | Prolyl | $\overline{HN.CH_2.CH_2.CH_2}.CHCO-$ |
| Ser | Seryl | $HOCH_2CH(NH_2)CO-$ |
| Thr | Threonyl | $CH_3CH(OH)CH(NH_2)CO-$ |
| Tyr | Tyrosyl | $p\text{-}HOC_6H_4CH_2CH(NH_2)CO-$ |
| Val | Valyl | $(CH_3)_2CHCH(NH_2)CO-$ |

The compounds can be prepared by the reaction of insulin or an insulin salt with an activated carboxylic acid of the desired structure. Typical of the acids that can be used (as such or in activated form) to prepare the compounds of the present invention are phthalic acid, isophthalic acid, terephthalic acid, 3-carboxy-α-thiophenic acid, 4-carboxy-α-thiophenic acid, 5-carboxy-α-thiophenic acid, 2-carboxy-β-thiophenic acid, 4-carboxy-β-thiophenic acid, 5-carboxy-β-thiophenic acid, 3-carboxypicolinic acid, 4-carboxypicolinic acid, 5-carboxypicolinic acid, 6-carboxypicolinic acid, 4-carboxynicotinic acid, 5-carboxynicotinic acid, 6-carboxynicotinic acid, and the like.

Examples of activated carboxylic acid derivatives which can be used in the reaction include carboxylic acid anhydrides, halides, azides, and the like. When the two carboxy groups of the desired side chain are in a position ortho to each other, an internal anhydride can be prepared utilizing any of the readily available dehydrating agents such as phosphorous pentoxide, phosphorus oxychloride, thionyl chloride, and the like. When the appropriate side chain contains the two carboxy groups in meta or para positions, half-acid chlorides or bromides can be prepared, as can intermolecular homogeneous anhydrides or mixed anhydrides, utilizing such reagents as trifluoroacetic anhydride, trichloroacetic anhydride, and the like.

Carboxyaroylation can also be carried out with the appropriate dicarboxylic acid employed in conjunction with an equimolar proportion of a carbodimide such as N,N'-diisopropylcarbodiimide,
N,N'-dicyclohexylcarbodiimide,
N,N'-(p-dimethylaminophenyl)carbodiimide,
1-cyclohexyl-3-[2-morpholinyl-(4)-ethyl]carbodiimide metho-p-toluenesulfonate, or the like.

When employing these methods, the carboxyaroylation proceeds at ordinary temperatures in aqueous solvents and can, depending upon the molar proportion of carboxyaroylating agent used, lead to the formation of mono-, bis-, and tris(carboxylaroyl) insulin derivatives. Typically one can dissolve an insulin salt in water at or about pH 3, adjust the pH to about 7 or above, and stir the resulting solution at room temperature with an equimolar amount or more of the activated carboxylic acid compound dissolved in at least a minimum quantity of an organic water-miscible solvent such as dimethylformamide, dimethyl sulfoxide, tetrahydrofuran, acetone, dioxane, or the like The reaction is complete in from about 1 to about 12 hours, and the product is purified by dialysis of the reaction mixture against water, then lyophilizing, or by precipitation of the product with an excess of an organic water-miscible solvent such as ethyl alcohol, acetone, dioxane, tetrahydrofuran, or the like. Alternatively, the product can be isolated by adjustment of the pH of the crude reaction mixture to about the isoelectric point of the product, at which point precipitation will occur. Electrophoretic separation of the mixtures obtained on carboxyaroylation of insulin has demonstrated the presence of the mono-, di-, and tri-substituted species. It is a general rule that the greater the substitution, the less the intrinsic insulin-like action and the longer the duration of activity. The preferred concentration of side chain is about 1.5 to about 2.5 side-chain groups per insulin molecule. Above 2.5 groups per insulin molecule, the intrinsic activity is too small to be of therapeutic value. Below 1.5 groups per insulin molecule, the duration of activity is not significantly greater than that of NPH Insulin.

The following examples are presented to describe the invention more clearly, but are not to be construed as exclusive embodiments thereof.

EXAMPLE I

Phthaloyl insulin

A suspension of 12 g. of insulin in 1 liter water was adjusted with 1 N hydrochloric acid to pH 3, at which point the insulin was completely dissolved. The solution was then adjusted to pH 7 with 2 N sodium hydroxide. To the resulting solution were added dropwise over a 35-minute period a solution of 592 mg. of phthalic anhydride in 25 ml. dimethylformamide. During the addition of the phthalic anhydride, the pH of the reaction medium was kept constant with 2 N sodium hydroxide, 6.7 millimoles of base being required. The resulting solution was dialyzed and lyophilized, yielding 12.19 g. of phthaloyl insulin.

EXAMPLE II

Using the procedure of Example I, 120 mg. of insulin and 126.5 mg. of quinolinic acid anhydride were reacted to yield a mixture of 2-carboxynicotinoyl insulin and 3-carboxypicolinoyl insulin. The product after dialysis and lyophilization weighed 136 mg.

EXAMPLE III

Isophthaloyl insulin

A solution was prepared containing 485 mg. of isophthalic acid dissolved in enough dimethylformamide to give 2 ml. of solution. Another solution was prepared containing 1.235 g. of 1-cyclohexyl-3-[2-morpholinyl-(4)-ethyl]carbodiimide metho-p-toluenesulfonate dissolved in enough dimethylformamide to give 3 ml. of solution. Both solutions were combined. The resulting mixture was allowed to stand for 1 hour with occasional warming in a hot water bath, then cooled to about 10° C. and filtered. Six-tenths milliliter of the resulting solution was added dropwise over 1 hour to a solution of 120 mg. of insulin in 10 ml. of water prepared in a manner similar to Example I. After dialysis and lyophilization, 134 mg. of isophthaloyl insulin were obtained.

EXAMPLE IV

γ-Carboxy-β-thiophenoyl insulin

Using the procedure of Example IV, 130 mg. of 3,4-thiophendicarboxylic acid and 217 mg. of 1-cyclohexyl-3-[2 - morpholinyl-(4)-ethyl]carbodiimide metho-p-toluenesulfonate were reacted with 120 mg. of insulin at pH 7 for 3 hours and 30 minutes giving 133 mg. of γ-carboxy-β-thiophenoyl insulin.

The compounds of the present invention are extremely soluble in water and in physiological saline solution. Amorphous insulin and benzoyl insulin are only sparingly soluble at pH 7, although amorphous insulin can be dissolved by acidifying to pH 4. It is believed that the increased solubility of the novel compounds is responsible for the desirable rapidity with which they manifest their activity. The fact that they are more soluble also suggests that their prolonged activity may be due to increased serum binding or to higher resistance to enzymic decomposition.

Additionally the compounds of the present invention have a higher intrinsic activity than the benzoyl derivatives. That is, a product of the same intrinsic activity will be obtained by the administration of a smaller number of insulin residues than from the use of the corresponding benzoyl product.

Intrinsic activity is determined in the following manner. A solution of the subject compound of known concentration is injected subcutaneously into mice, each test group containing 20 mice, at a series of dosage levels. The mice are observed for 30 minutes and the number of convulsing animals in each dosage group is noted. The quantity of material required to cause convulsions in 50 percent of the animals is compared to a dose of a standard insulin preparation which also causes convulsions in 50 percent of the test animals.

After determination of intrinsic activity, the duration of hypoglycemic activity is then determined in the following manner.

The sample to be tested is dissolved in a minimum amount of a solution prepared by dissolving 1.2 ml. conc. hydrochloric acid, 9.1 ml. phenol (90%), and 64 g. glycerine in enough water to make 4 liters of solution. An amount calculated to give a dose of 0.4 International Unit of insulin activity per kilogram of body weight is injected sub-cutaneously into the abdomen of a mature white rabbit. The rabbit is bled from the marginal ear vein prior to injection (time: 0 hours) and at regular intervals thereafter. At each bleeding 0.05 ml. blood is collected and added to 0.95 ml. of an aqueous solution containing 1 mg./ml. sodium chloride and 100 I.U. of heparin. The resulting solution is dialyzed and photometrically compared to a standard glucose solution. The color reaction used for photometric determination is that produced by the reaction of the glucose-containing solution with an excess of ferricyanide reagent. Readings are in mg. percent of glucose in the 1 ml. solution. Repetitive tests in 5 or more animals are averaged and compared to the pre-injection glucose level. The following tables demonstrate the absolute blood glucose levels in mg. percent for crystalline insulin, benzoyl insulin, phthaloyl insulin, and pyridine-2,3-dicarboxoyl insulin at a dose of 0.4 I.U. per kg. of body weight for 5 or more animals. The last line of each table shows the percent of the pre-injection blood sugar present at each bleeding time.

I claim:
1. A modified insulin having the structure:

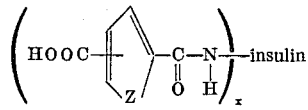

wherein

Z is

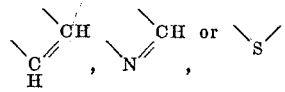

$x$ is from 1 to 3 such that the average value of $x$ is between about 1.5 and about 2.5; and N is the nitrogen atom of the amino group of phenylalanine ($A_1$), the amino group of glycin ($B_1$), and the $\epsilon$-amino group of lysine ($B_{29}$) of the insulin molecule.

2. A modified insulin as in claim 1, said modified insulin having the structure:

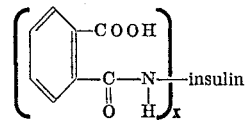

wherein $x$ is from 1 to 3 such that the average value of $x$ is between about 1.5 and about 2.5; and N is the nitrogen atom of the amino group of phenylalanine ($A_1$), the amino group of glycine ($B_1$), and the $\epsilon$-amino group of lysine ($B_{29}$) of the insulin molecule.

3. A modified insulin as in claim 1, said modified insulin having the structure:

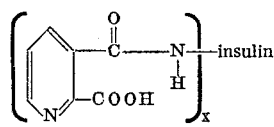

wherein $x$ is from 1 to 3 such that the average value of $x$ is between about 1.5 and about 2.5; and

| No. | Rabbit, body weight (g.) | Dose, I.U./kg. | Time (hours) | | | | | |
|---|---|---|---|---|---|---|---|---|
| | | | [1] 0 | 1 | 2 | 3 | 5 | 7 |
| INSULIN (crystalline) | | | | | | | | |
| 1 | 3,110 | 0.4 | 75 | 28 | 24 | 39 | 71 | 72 |
| 2 | 3,560 | 0.4 | 63 | 38 | 36 | 53 | 64 | 65 |
| 3 | 3,580 | 0.4 | 69 | 41 | 41 | 56 | 74 | 78 |
| 4 | 3,335 | 0.4 | 72 | 33 | 38 | 53 | 71 | 72 |
| 5 | 3,350 | 0.4 | 72 | 31 | 22 | 35 | 69 | 76 |
| Average | | | 70 | 34 | 34 | 47 | 71 | 74 |
| Percent of control | | | | 49 | 49 | 67 | 102 | 105 |
| BENZOYL INSULIN | | | | | | | | |
| 1 | 2,360 | 0.4 | 74 | 76 | 74 | 75 | 73 | 65 |
| 2 | 3,000 | 0.4 | 86 | 81 | 79 | 79 | 80 | 90 |
| 3 | 2,920 | 0.4 | 85 | 100 | 91 | 100 | 81 | 77 |
| 4 | 2,850 | 0.4 | 98 | 100+ | 100+ | 100+ | 97 | 93 |
| 5 | 2,815 | 0.4 | 77 | 91 | 78 | 75 | 73 | 74 |
| Average | | | 84 | 90 | 84 | 86 | 81 | 80 |
| Percent of control | | | | 107 | 100 | 102 | 97 | 95 |
| PHTHALOYL INSULIN | | | | | | | | |
| 1 | 2,850 | 0.4 | 73 | 41 | 35 | 37 | 35 | 36 |
| 2 | 2,750 | 0.4 | 67 | 43 | 42 | 46 | 47 | 47 |
| 3 | 3,740 | 0.4 | 76 | 48 | 48 | 51 | 59 | 60 |
| 4 | 3,400 | 0.4 | 78 | 46 | 45 | 45 | 47 | 49 |
| 5 | 3,250 | 0.4 | 71 | 46 | 39 | 37 | 46 | 48 |
| Average | | | 73 | 45 | 42 | 43 | 47 | 48 |
| Percent of control | | | | 62 | 58 | 59 | 64 | 6 |
| PYRIDINE-2,3-DICARBOXOYL INSULIN | | | | | | | | |
| 1 | 2,485 | 0.4 | 76 | 27 | | 21 | X | X |
| 2 | 2,840 | 0.4 | 73 | 41 | | 51 | 45 | 71 |
| 3 | 2,900 | 0.4 | 74 | 43 | | 39 | 45 | 65 |
| 4 | 3,130 | 0.4 | 84 | 43 | | 47 | 64 | 80 |
| 5 | 3,200 | 0.4 | 85 | 49 | | 51 | 59 | 71 |
| 6 | 2,670 | 0.4 | 77 | 49 | | 46 | 51 | 72 |
| Average | | | 78 | 42 | | 43 | 57 | 72 |
| Percent of control | | | | 54 | | 54 | 73 | 92 |

X—Insulin shock.
[1] Control.

N is the nitrogen atom of the amino group of phenylalanine ($A_1$), the amino group of glycine ($B_1$), and the ε-amino group of lysine ($B_{29}$) of the insulin molecule.

4. A modified insulin as in claim 1, said modified insulin having the structure:

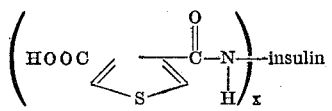

wherein
x is from 1 to 3 such that the average value of x is between about 1.5 and about 2.5; and
N is the nitrogen atom of the amino group of phenylalanine ($A_1$), the amino group of glycine ($B_1$), and the ε-amino group of lysine ($B_{29}$) of the insulin molecule.

References Cited

UNITED STATES PATENTS
3,471,464  10/1969  Bellet et al. _____ 260—112.7

FOREIGN PATENTS
136,434  2/1950  Australia.
614,990  12/1948  Great Britain.

OTHER REFERENCES
Carmain-Giahicani et al., Comptes Rendus Soc. Biologie (Paris) 158, 790–793 (1964).

Tietze et al., Biochim-Biophys., Acta 59, 336–346 (1962).

Levy et al., Biochemistry (Wash.) 6, 3559–3568 (1967).

LEWIS GOTTS, Primary Examiner

M. M. KASSENOFF, Assistant Examiner

U.S. Cl. X.R.

424—178